S. T. VARIAN.
BELL-PULLS.
No. 195,188.       Patented Sept. 11, 1877.
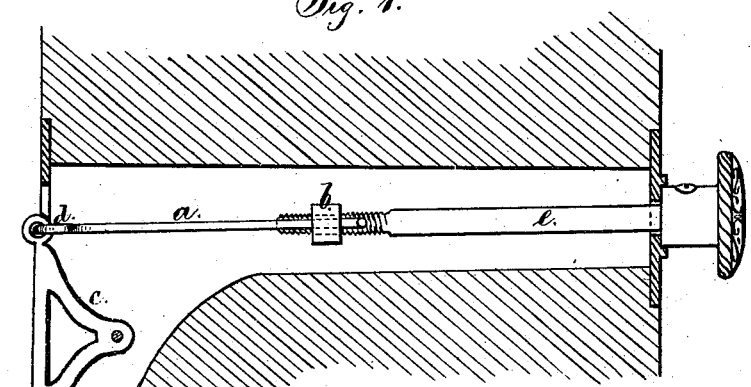
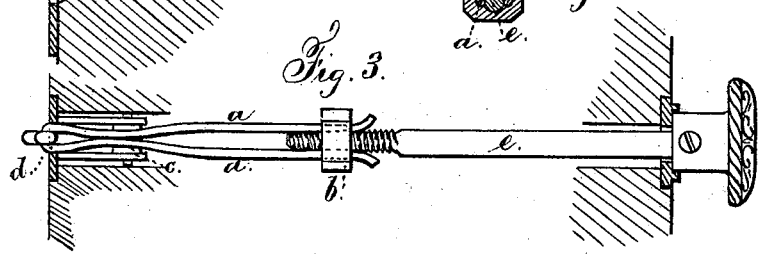
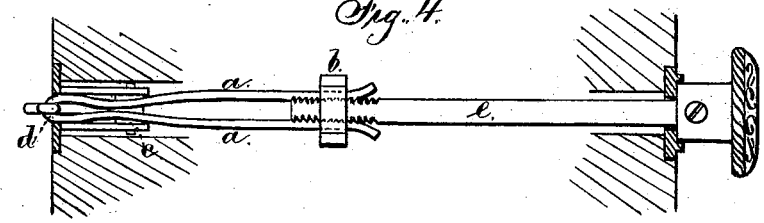
Witnesses
Harold Serrell
Geo. T. Pinckney
Inventor
Samuel T. Varian
per
Lemuel W. Serrell atty

UNITED STATES PATENT OFFICE.

SAMUEL T. VARIAN, OF PLAINFIELD, NEW JERSEY.

IMPROVEMENT IN BELL-PULLS.

Specification forming part of Letters Patent No. 195,188, dated September 11, 1877; application filed April 9, 1877.

*To all whom it may concern:*

Be it known that I, SAMUEL T. VARIAN, of Plainfield, in the county of Union and State of New Jersey, have invented an Improvement in Bell-Pulls, of which the following is a specification:

Bell-pulls have been made with a screw-and-hook attachment for connecting the bell-pull spindle with the crank; but this device is not easily connected together.

My invention consists in the bell-pull spindle and crank, connected together by a wire bent double and passed through the hole in the crank. The ends or points pass through a nut, and are bent slightly outward.

The nut has a central opening and two side grooves, and it is placed over the two ends of the wire. The spindle is made with a screw-thread cut upon a portion of one end, which is made smaller than the rest, and the tip or point of the thread is made tapering.

In placing the parts of this bell-pull together, the wire with the nut over its end is entered into the door-jamb on one side and the spindle in the other side, and the screw of the spindle is screwed into the nut between the ends of the wire, and in so doing clamps and holds the wires very firmly.

In the drawings, Figure 1 is an elevation and partial section of the bell-pull and casing. Fig. 2 is a section transversely of the nut, wire, and spindle. Fig. 3 is a plan of the bell-pull, and Fig. 4 a modified form of said bell-pull.

$a$ is the bent or V-shaped piece of wire, and $b$ is the nut placed over one end. $c$ is the bell-crank, through one end of which the loop $d$ of the wire $a$ passes, and $e$ is the spindle that is screwed into the nut $b$ between the ends of the wire $a$, to clamp and hold said wires by the screw-threads bedding themselves into the surface of the wire.

The handle and mountings may be of any desired description, the essential parts of this invention being the spindle, nut, and wire. They can readily be attached to handles or pulls now in use.

In the modified form shown in Fig. 4 there are grooves on the sides of the square spindle $e$, and a screw-thread on the angles of the same, so that the ends of the wire $a$ may be placed in these grooves, and a nut, $b$, run upon the spindle over the wire, and thereby hold it firmly in place.

I claim as my invention—

The bell handle and spindle $e$, with a screw upon its surface, in combination with the nut $b$ and bent wire $a$, the parts being constructed and operating substantially as and for the purposes specified.

Signed by me this 6th day of April, A. D. 1877.

SAMUEL T. VARIAN.

Witnesses:
HAROLD SERRELL,
GEO. T. PINCKNEY.